Sept. 22, 1942.   J. E. WALDO   2,296,320
TOOL DRIVE
Filed June 17, 1941   2 Sheets-Sheet 1
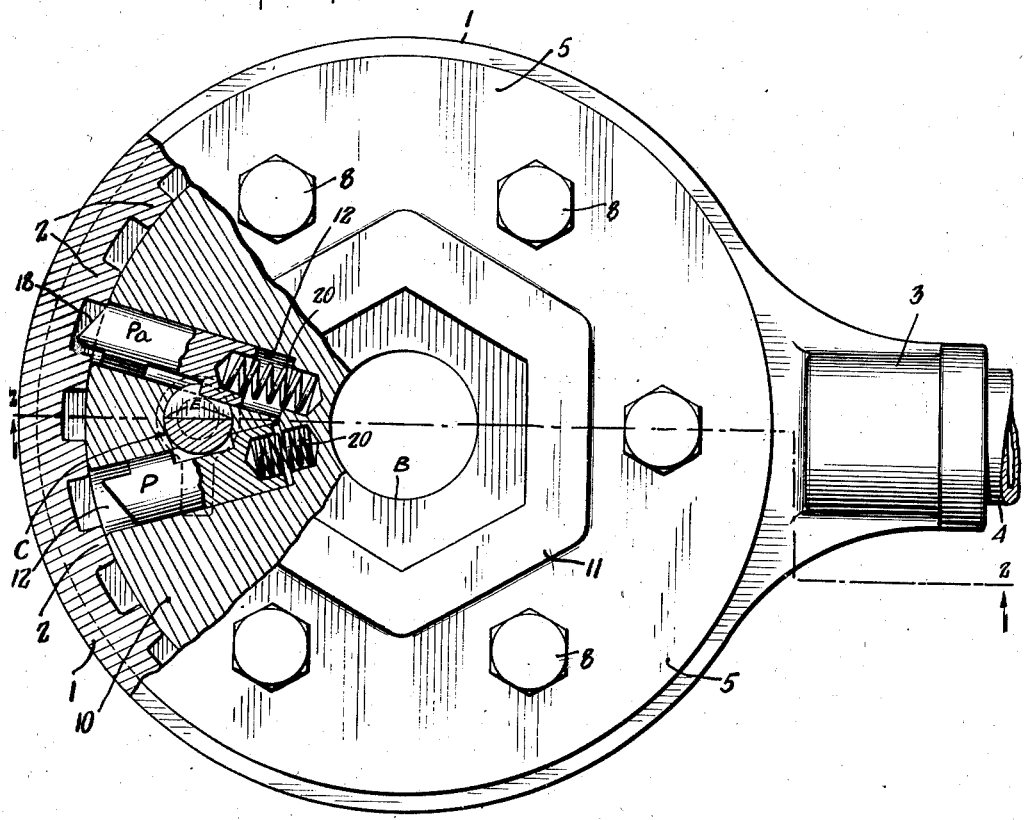
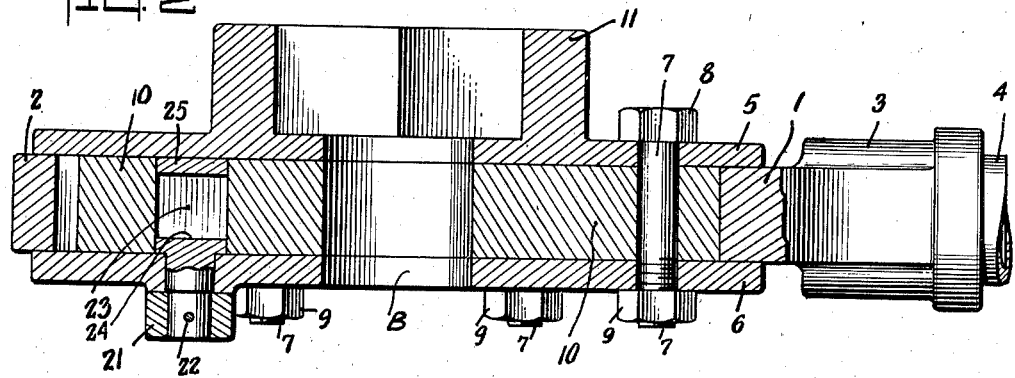
INVENTOR.
John L. Waldo
BY Mock r Blum
ATTORNEYS

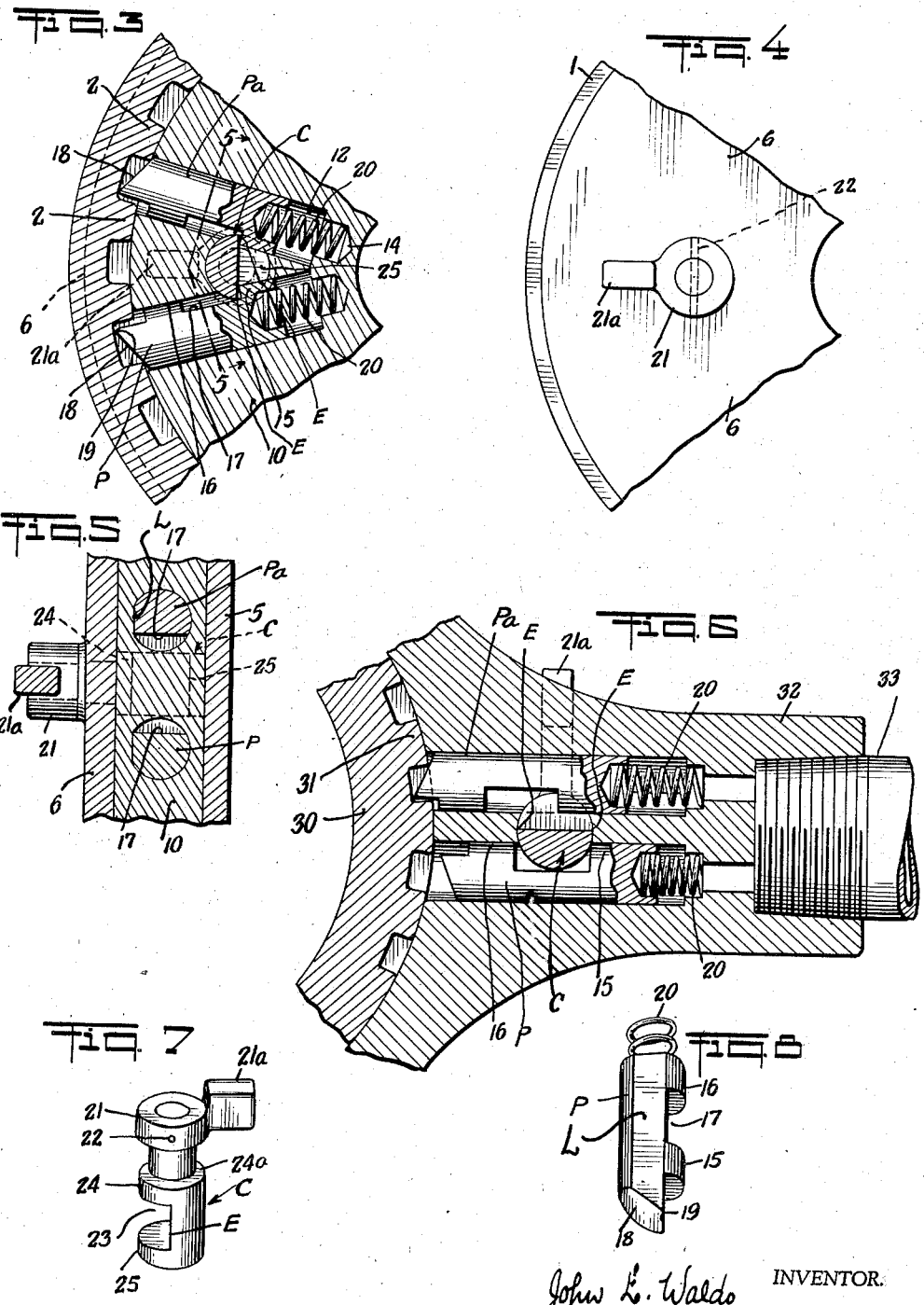

Patented Sept. 22, 1942

2,296,320

UNITED STATES PATENT OFFICE 2,296,320

TOOL DRIVE

John E. Waldo, Bridgeport, Conn., assignor to Armstrong Manufacturing Co., Bridgeport, Conn., a corporation of Connecticut Application June 17, 1941, Serial No. 398,383

6 Claims. (Cl. 10—124)

My invention relates to a new and improved tool drive.

One of the objects of my invention is to provide an improved drive of the ratchet type for operating tools which are used in threading pipes and other objects, drills, reamers, and other types of tools.

Another object of the invention is to provide a ratchet mechanism which is simple to construct and assemble and operate and which can be used for turning a tool or tools in unison with an operating member, or for turning a tool or tools only when the operating member is turned in a predetermined direction.

Other objects of the invention will be set forth in the annexed description and drawings which illustrate preferred embodiments thereof, it being understood that the above general statement of the objects of my invention is intended generally to explain the same without limiting it in any manner.

Fig. 1 is a top plan view of the improved device, the representation of a part of the cover having been omitted. In this view the ratchet mechanism is set to operate the driven part, only when the driving part or operating member is turned clockwise.

Fig. 2 is a section on the line 2—2 of Fig. 1.

Fig. 3 is a partial sectional view in a horizontal plane, illustrating the respective pawls in their respective positions in which the driving member and the driven part or member are locked to each other, so that the driven member is turned when the driving member is turned in either direction.

Fig. 4 is a partial bottom plan view showing the control member in the locking position which corresponds to Fig. 3.

Fig. 5 is a sectional view on the line 5—5 of Fig. 3.

Fig. 6 is a sectional view in a horizontal plane, illustrating a modification of the invention.

Fig. 7 is a perspective detail view of the cam or control member for controlling the positions of the respective pawls.

Fig. 8 is a detail perspective view of one of the pawls.

The device comprises an annular body 1 which is provided with internal teeth 2, which are spaced circumferentially from each other. This annular body is the driving member. These teeth 2 are identical and the respective spaces or valleys between said teeth are equal and of identical shape. The annular body 1 is integral with an extension which has a socket 3, in which an actuating handle 4 can be fitted. For convenience, the device will be described with reference to the horizontal position which is shown in Fig. 2, although the device can be operated in any position. Said body 1 is provided with respective top and bottom cover plates 5 and 6 which radially overlap the tips of the teeth 2. Said cover plates 5 and 6 are connected to each other by bolts 7 which have heads 8, and by nuts 9. Said nuts 9 are screwed upon the threaded ends of the bolts 7. The bolts 7 are located inwardly of the tips or inner ends of the teeth 2, and said bolts fit closely in the bores of an inner ring 10, whose periphery is close to the inner ends of the teeth 2. This inner ring 10 is the driven member. The inner ring 10 and its cover plates 5 and 6 therefore turn in unison. In this embodiment the cover plate 5 is provided with a socket 11, in which the shank of a tool (not shown) can be fitted so that the tool is rotated in unison with the members 5, 6 and 10. The members 5 and 10, or 6 and 10, may be integral.

The members 1, 5, 6 and 10 are provided with a common central axis which coincides with the axis of bore B. The bore or recess of the socket member 11 is of greater diameter than the diameter of the bore B.

In using the device, the inner ring 10 is provided with a suitable bearing. For example, if the plate 5 supports the usual dies for forming a tapered or non-tapered thread in a pipe, said pipe extends through bore B and it provides a bearing on which the inner ring is turnably mounted.

As shown in Figs. 1 and 3, the inner ring 10 is provided with a pair of closely adjacent and radial recesses 12. Each recess 12 has a reduced inner extension 14 and the inner end of each reduced extension 14 is of conical shape. Pawls P and Pa are mounted for radial sliding movement in the respective recesses 12. Said pawls are generally of identical construction. Their planar walls L are parallel to each other in the assembled device. As shown in Fig. 8, the pawl P is provided with lateral projections 15 and 16, so that a recess or cut-out 17 is provided between said projections 15 and 16. The walls of said projections 15 and 16, which face each other, are planar. The pawl P is provided with an end face 18, whose plane is inclined to the longitudinal axis of the respective pawl. Said end face 18 has an edge 19, which may be sharp or rounded. A compression spring 20 is associated with each pawl. The radially outer end of each compression spring 20 is located in a suitable recess which is provided in the radially inner end of the respective pawl P or Pa. Each pawl P and Pa is therefore urged radially outwardly, in order to mesh with the teeth 2.

As shown in Figs. 1 and 3, the respective end faces 18 are oppositely inclined with respect to the respective longitudinal axes of the respective pawls P and Pa.

As shown in Fig. 8, each pawl P and Pa is provided with a longitudinal planar face L. As shown in Fig. 5, the respective recesses 12 have planar walls against which said planar faces L slidably abut. These planar walls of recesses 12 may be provided in any suitable manner, as by inserts which are located in said recesses. When each pawl is located in its respective recess 12, the respective planar face L contacts with the respective planar face of the recess 12. Each pawl P and Pa is therefore prevented from turning around its longitudinal axis while the pawl is located in its respective recess 12, and the inclined end faces 18 are maintained in the inclined relation which is illustrated in Figs. 3 and 6. The cross-sections of the projections 15 and 16 are circular, save for the straight line parts of said cross-sections which correspond to the longitudinal planar faces L.

The meshing or unmeshing of the respective pawls, with the teeth 2, is controlled by a cam member C. This has a reduced end to which a collar 21 is detachably connected by means of a pin 22 or the like. This collar 21 is located below or externally to the bottom plate 6. Said collar 21 has an integral finger-hold 21a.

The body of the cam member C is provided with a lateral recess or cut-out 23, thus providing lugs 24 and 25. The inner longitudinal wall of said recess 23 is planar, and the end lateral walls of said recess 23 are also planar. This planar shape is not important, because the pawls are controlled by the longitudinal edges E, and I can use any cam device which has such edges, or equivalent parts. The cam member C is turnably mounted in a suitable bore of the member 10 and the axis of said bore is parallel to the axis of bore B. The reduced end of the member C is located turnably in a suitable bore of the annular plate 6.

The shoulder 24a of the member C and the collar 21, prevent the member C from moving in the direction of its longitudinal axis, relative to the member 6. The shape of the member C, between the elements 24 and 25, is that of a recessed cylinder. The lugs 24 and 25 have circular cross-sections.

When the member 21a is in the position shown in Fig. 4, the respective longitudinal edges E of the member C are located in the respective radial recesses 12, as shown in Fig. 3. By turning the member 21a clockwise from the position shown in Fig. 3, the cam member C is moved wholly out of the recess 12 in which pawl P is to be located. Pawl P can then be inserted into said recess and the member 21a can then be moved back to the position shown in Fig. 3 and Fig. 4. The respective longitudinal edge E of the body of the cam member C is thus caused to intermesh with the recess 17 of the pawl P. The member 21 is then turned counterclockwise from the position shown in Fig. 3, through an angle of almost 90°. This causes the cam member C to clear the other recess 12, in which pawl Pa is to be located. Pawl Pa is then inserted into its respective recess. Upon moving the member 21a back to the position shown in Fig. 3 and Fig. 4, the respective longitudinal edges E of the member C are caused to enter the recesses 17 of both pawls P and Pa. The ring 10 can then be inserted into the ring 1. Upon turning the finger-hold 21a clockwise from the position shown in Fig. 3, the pawl Pa is retracted to its inoperative position, by the thrust of the respective edge E against the lug 16 of said pawl Pa. Said pawl Pa is thus retracted to its inoperative position when the member 21a is turned clockwise from the position shown in Fig. 3. If the finger-hold 21a is turned clockwise through a total angle of about 70° from the position shown in Fig. 3, the cam member C is self-locked in the position in which it holds said pawl Pa in the inoperative position. The cam member C can be turned about 140°–160° from the position shown in Fig. 3. Upon turning the thumb piece 21a counterclockwise from the position shown in Fig. 3, the pawl P can be similarly held in its retracted and inoperative position, this position being illustrated in Fig. 1.

When the parts are in the position shown in Fig. 1, and the ring 1 is turned clockwise, the inner ring 10 is simultaneously turned. In said position of the parts, the ring 1 can be turned counterclockwise without turning the ring 10, because the inclined end face 18 of the operative pawl Pa permits said pawl Pa to slip over the teeth 2.

When the positions of the pawls is the reverse of the position shown in Fig. 1, the ring 1 actuates the ring 10 only when the ring 1 is turned counterclockwise.

In the embodiment of Fig. 6, an inner ring 30 is provided with teeth 31, which correspond in function to the teeth 2. The outer ring has a handle portion 32, into which the tapered end of an actuating member 33 can be screwed. The cam member C is turnably mounted in the handle portion 32 of the outer ring. The pawls P and Pa are of the construction previously described, and they are urged to respective operative positions by means of respective compression springs 20.

In Fig. 3, the pawls are slidably mounted in the driven member, and in Fig. 6 the pawls are slidably mounted in the drive member. This is a mere reversal of parts. Hence, whenever I specify the location of the pawls in the driven-member, as in the embodiment of Fig. 1, in a claim or claims, I include said reversal of parts in the scope of said claim or claims.

The plates 5 and 6 partially overlap the drive-member 1, but sufficient clearance is provided so that the assembled drive-member and driven-member can turn freely relative to each other about a predetermined common axis, namely, the longitudinal axis of bore B. The drive-member 1 can slip relative to driven-member 10, if only a single pawl is in operative position, when the drive-member is rotated about said common axis in a predetermined direction, because the operative pawl has a beveled face. It is well-known to provide ratchet-teeth which can slip relative to a cylindrical pawl or other pawl which does not have a beveled face, so that the invention is not limited to pawls which have beveled faces.

Referring to Fig. 1, the operative pawl Pa slips relative to the teeth 2, when the drive-member is turned relative to the driven-member 10 in a predetermined respective direction, namely, the counterclockwise direction. The drive-member 1 and the driven-member 10 rotate in unison when the drive-member 1 is turned relative to the driven-member 10 in a direction (clockwise), which is reverse to said predetermined respective direction. The plates 5 and 6 and the bolts 7 and nuts 9, constitute means for assembling drive-member 1 and driven-member 10.

The respective predetermined directions, in which the pawls P and Pa slip relative to the teeth, are opposed.

The lug 16 is designated as the radial inner lug and the lug 15 is designated as the radial outer lug.

The bore in which the cam member C is located, has openings which communicate with the respective recesses 12, between which said bore is located. The axis of said bore is parallel to the common axis of the drive-member and the driven-member.

As shown in Fig. 1, only part of the tapered face 18 of the operative pawl enters the space between a pair of adjacent teeth, when the pawl is in its outermost radial position.

In each embodiment, either of the drive-members or driven-members may be designated as a first member, and the other of said pair may be designated as a second member. The pawls may be designated as motion-controlling devices, each of which is biased to its operative position.

When the member C is in the position shown in Fig. 1, the edge of the lug 16 of the pawl P abuts a radius of the member C which makes a small angle with the longitudinal axis of the pawl P. The pawl P therefore exerts only a small turning force on the member C, and the friction of member C in members 10 and 6 is sufficient to hold the member C in the adjusted position which is shown in Fig. 1. In the position shown in Fig. 3, the pawls P and Pa exert equal and opposite turning forces on the member C.

I have described preferred embodiments of my invention, but it is clear that numerous changes and omissions can be made without departing from the spirit of the invention.

As shown in Fig. 6, the rounded part of the body of the control member C may fit snugly between the lugs of the respective pawl which is held in the inoperative position by said control member. The position of control member C which is shown in Fig. 1 and Fig. 6, is an operative position thereof. The self-locking of the control member C is independent of its friction in its bearing-bores, as this self-locking is secured by the configuration of the member C and the respective inoperative pawl.

I claim:

1. A tool drive comprising a driven-member which has a tool-mount, a drive-member, means assembling said driven-member and said drive-member, said drive-member being rotatable in unison with said driven-member around a common predetermined axis, said drive-member being also rotatable relative to said driven-member around said axis, said drive-member having a series of spaced teeth, said driven-member having two spaced pawls, each pawl being slidably supported by said driven-member, each pawl being slidable relative to said driven-member in a direction parallel to the axis of said pawl, each pawl being movable relative to said driven-member towards and away from said teeth, said pawls being rotatable about said common axis in unison with said driven-member, spring-means urging said pawls towards said teeth, control-means movably supported by said driven-member and located between said spaced pawls and adapted to hold either or neither of said pawls in inoperative position relative to said teeth, each pawl slipping relative to said teeth when said pawl is in operative position and the other pawl is in inoperative position and when the drive-member is turned relative to said driven member in a predetermined respective direction, each pawl locking with one of said teeth when it is in operative position and when said drive-member is turned relative to said driven-member in a direction which is opposed to said predetermined respective direction, said predetermined respective directions being opposed, said pawls being located to mesh between different pairs of said teeth and locking the driven-member to the drive-member when both pawls are in operative position.

2. A tool-drive comprising an annular drive-member which has internal spaced teeth, an annular driven-member located in said drive-member, said driven-member having plates fixed thereto and abutting the respective end-walls of said driven-member, said plates overlapping the drive-member and permitting the drive-member to rotate relative to the driven-member around a predetermined axis, said driven-member having two spaced radial recesses which extend inwardly from the periphery of said driven-member, a pawl mounted slidably and non-turnably in each of said recesses, each pawl having an outer end-face which is inclined to the longitudinal axis of the respective pawl, said end-faces being oppositely inclined, each end-face being shaped to enter the space between a pair of adjacent teeth only partially, each recess having a spring which urges the respective pawl radially outwardly, each pawl having a pair of radially-spaced lateral lugs intermediate the ends of the respective pawl, a control member turnably located in a bore of said driven-member, said bore being located between said recesses and communicating with said recesses, the axis of said bore being parallel to said predetermined axis, said control member having a lateral recess intermediate the ends thereof, said last-mentioned recess having a longitudinal wall which has longitudinal edges which are substantially parallel to the axis of the bore, said control member being turnable in said bore to a position in which each of said edges is located in a respective radial recess, each pawl being then outwardly radially urged under the action of the respective spring until the radial inner lug of each pawl abuts said longitudinal wall, each said pawl then having its outer end located in the space between a pair of said teeth so that said drive-member is then locked to said driven-member, said control-member being also turnable in its bore to a position in which it wholly clears one of said recesses and in which part of said control-member is then located in the other recess and in engagement with the radial inner lug of the pawl of said other recess to hold the pawl of said other recess in inoperative position, said control-member having an accessible and manually operable member for turning said control-member in its bore, said driven-member having a tool-support.

3. A device according to claim 2 in which the outer wall of said control-member at said recess is of partial cylindrical shape, only part of said outer wall being located between the lugs of the pawl which is held in inoperative position by said control-member.

4. A tool-drive comprising a first member, a second member, means assembling said first member and said second member, said first member and said second member having a common axis of rotation, motion-controlling devices, each said device being movable to an operative position and to an inoperative position, each said device being supported on one of said members and being movable relative to both said members, each said device locking the members to each other only when the said members are moved relative to each other in a single predetermined respective direction, said respective directions being opposed, said devices locking said members to each other when both said devices are in operative position so that said members then turn only in unison, a manually operative control device movably mounted on one of said members and adapted to hold either one of said motion-controlling devices in inoperative position and also to permit both motion-controlling devices to move to operative position, said motion-controlling devices being biased to respective operative positions.

5. A tool drive comprising a first member, a second member, means assembling said first member and said second member, said first member and said second member having bores which have a common axis, one of said members being recessed and having spaced pawl-receiving recesses in which respective pawls are slidably mounted so that each pawl is movable back-and-forth in its respective recess relative to both said members, each said pawl having a longitudinal axis and being thus movable in a direction parallel to its longitudinal axis, each said pawl having an operating end, the other of said members being toothed and having spaced teeth which are shaped to intermesh with said operating ends when said pawls are in respective operative positions, each pawl being biased to its operative position, said teeth and said operating ends being shaped so that said teeth can slip relative to said respective pawls only in respective opposed directions so that said members are locked to each other when both pawls are in respective operative positions and said members can turn relative to each other around said common axis only in a single direction when only one of said pawls is in operative position, said respective single directions being opposed, each said pawl having a lug, a control member turnably mounted in the recessed member intermediate said pawl-receiving recesses and having operating edges which abut said lugs when both pawls are in operative position and the control member is in inoperative position, said control member being turnable clockwise and counterclockwise from said inoperative position so that one of its operating edges thrusts against the lug of the selected pawl and moves the selected pawl to inoperative position while leaving the other pawl in operative position, the body of the control member laterally between its operating edges being shaped to hold the control member in operative position against the thrust of the selected pawl.

6. A device according to claim 5 in which each pawl has a second lug which is closer to said teeth than the respective first-mentioned lug, the part of the body of said control member which is between said operating edges and which is between the lugs of a pawl which is in inoperative position, being substantially of partial cylindrical shape.

JOHN E. WALDO.